United States Patent [19]
Penttonen

[11] Patent Number: 5,835,584
[45] Date of Patent: *Nov. 10, 1998

[54] METHOD AND APPARATUS FOR IMPLEMENTING SERVICES IN TELEPHONE NETWORKS PROVIDED WITH CO-CHANNEL SIGNALING

[75] Inventor: Jyrki Penttonen, Espoo, Finland

[73] Assignee: Tecnomen Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 560,559

[22] Filed: Nov. 17, 1995

[30] Foreign Application Priority Data

Nov. 24, 1994 [FI] Finland ................................. 945516

[51] Int. Cl.⁶ .............................. H04M 3/42; H04M 1/64
[52] U.S. Cl. ...................... 379/230; 379/207; 379/219; 379/229; 455/413
[58] Field of Search ................................. 379/230, 207, 379/201, 211, 243, 229, 213, 142, 67, 219; 455/414, 445, 461, 413, 412

[56] References Cited

U.S. PATENT DOCUMENTS

| | | | |
|---|---|---|---|
| 4,310,727 | 1/1982 | Lawsew | 379/230 |
| 5,134,647 | 7/1992 | Pugh et al. | 379/214 |
| 5,237,604 | 8/1993 | Ryan | 379/220 |
| 5,255,315 | 10/1993 | Bushnell | 379/221 |
| 5,353,331 | 10/1994 | Emery et al. | 455/414 |
| 5,367,566 | 11/1994 | Moe et al. | 379/243 |
| 5,377,186 | 12/1994 | Wegner et al. | 379/230 |
| 5,392,344 | 2/1995 | Ash et al. | 379/243 |
| 5,408,524 | 4/1995 | Reum | 379/231 |
| 5,418,844 | 5/1995 | Morrisey et al. | 379/207 |
| 5,463,682 | 10/1995 | Fisher et al. | 379/201 |
| 5,469,496 | 11/1995 | Emery et al. | 455/461 |
| 5,471,519 | 11/1995 | Howe et al. | 379/67 |
| 5,497,373 | 3/1996 | Hulen et al. | 379/89 |
| 5,515,427 | 5/1996 | Carlsen et al. | 379/201 |
| 5,517,563 | 5/1996 | Norell | 379/221 |
| 5,519,770 | 5/1996 | Stein | 379/221 |
| 5,519,772 | 5/1996 | Akman et al. | 379/265 |
| 5,533,115 | 7/1996 | Hollenbach et al. | 379/265 |
| 5,555,299 | 9/1996 | Maloney et al. | 379/211 |
| 5,563,933 | 10/1996 | August et al. | 379/115 |
| 5,563,939 | 10/1996 | La Porta et al. | 379/201 |
| 5,579,379 | 11/1996 | D'Amico et al. | 379/142 |
| 5,610,972 | 3/1997 | Emery et al. | 379/207 |

Primary Examiner—Ahmad F. Matar
Assistant Examiner—Scott Wolinsky
Attorney, Agent, or Firm—Michael L. Dunn

[57] ABSTRACT

A method and apparatus for implementing telephone network services in networks provided with co-channel signaling. The signaling is routed over an intelligent node point and signaling information is converted at the node point for carrying out the services. Signaling information is processed separately from network switching equipment and voice transmissions relating to signaling information are not routed over the node point.

14 Claims, 8 Drawing Sheets

——— Voice channels
············ Signalling link
—·—·— Example signalling path
------ Signalling leg to messenger
━━━ Example voice path for message deposit

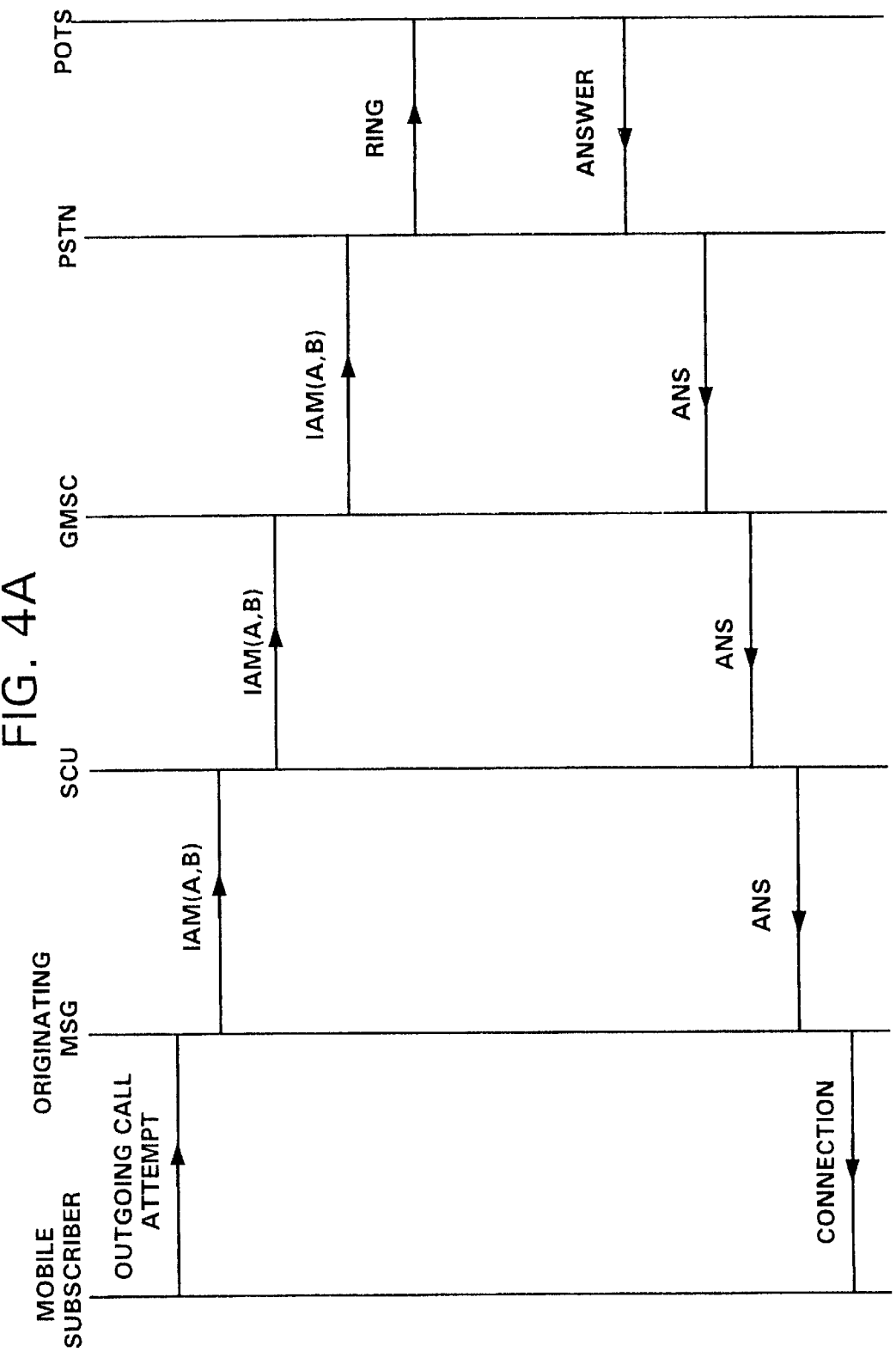

——————— TRANSMISSION PATH
················· SIGNALLING

METHOD AND APPARATUS FOR IMPLEMENTING SERVICES IN TELEPHONE NETWORKS PROVIDED WITH CO-CHANNEL SIGNALING

The present invention relates to a method and apparatus capable of using an existing or new telephone network for adopting extra services offered to subscribers by routing the signal information of calls over a separate node point.

There is a need in telephone networks for various extra services that are not always producible with existing exchange equipment.

When adding services in an existing telephone network, the implementation thereof requires major investments in exchange equipment if it is necessary to increase the capacity of both signalling and voice transmission. Therefore, services remain undeveloped. Another source of problems is the infrastructural diversity of telephone networks; equipment of various ages, developed with a variety of technologies by different manufacturers. For example, the transmission of signalling between pieces of equipment with different technologies can be problematic.

A solution to the above problem is the implementation of extra services in a telephone network by routing the signalling of calls in a concentrated fashion over such a control apparatus that is capable of determining said calls. The invention includes a method for implementing telephone network services in networks provided with co-channel signalling, wherein the voice paths can be routed separately from signal links, wherein the signalling is routed over an intelligent node point and the signalling information is converted at said node point for carrying out the services.

Signalling is processed apart from voice even with existing technology but a novel feature in the invention is the routing of signalling over an additional device. The voice path is not switched through said additional device. The method is operable in networks using co-channel signalling (e.g. the SS#7 signalling of ITU-T, specified in reference Q.700).

Regarding the terminology of SS#7 signalling, what is significant in terms of the invention is that the calls are not carried out on MTP (Message Transfer Part) level, which would require that the voice paths be also switched through the apparatus, but on the level of user parts TUP/ISUP (Telephone/ISDN User Part). The traditional solutions have operated on MTP level, the present device for implementing a corresponding function is STP (Signalling Transfer Point).

The invention also includes an apparatus for implementing services in a telephone network provided with a co-channel signalling, wherein the voice paths can be routed separately from signal links wherein the apparatus is a microprocessor controlled apparatus, which includes internal memory and an interface whereby it communicates with the network exchanges, monitors the signalling information of calls directed through the network for the identification of calls having services specified therefore and, by converting such signalling information, directs calls to a junction carrying out the service.

The extra services in a telephone network are implemented by means of an apparatus called ISU (Intelligent Signalling Unit) to be included in the network, which the signalling associated with calls is routed over and which modifies signal information (incoming/outgoing) for carrying out the service. The service itself is implemented in response to the signal information provided by ISU in an SCP (Service Control Part), which is a function complying with the IN standard.

Routing over ISU is specified in the routing charts of network exchanges.

Regarding the exchanges, the apparatus is transparent, i.e. the introduction of ISU in a network has no effect on the operation of the exchanges. The apparatus can be included in existing or new networks.

The apparatus communicates by way of signalling with user parts (e.g. ISUP, TUP, INAP) included in the exchanges of a network.

It is perfectly plausible to set a plurality of ISUs in parallel operation. No circuits are required therebetween as they can operate the way of independent exchanges and the network routing charts can be specified accordingly. This also results in an increased capacity and reliability. By providing, if necessary, a single telephone network with a plurality of ISUs in a decentralized manner it is possible to control the operation in more extensive networks as well.

A by-pass routing for ISU can be arranged in failure situations for added flexibility. Routing the entire signalling over ISU does not present a risk, since the routing charts can always be specified so as to find an alternative route. This secures the redundancy of routing. If ISU is out of action, the only consequence is that the service is not available.

BENEFITS OF THE INVENTION

When the service is carried out by routing the signalling and voice separately, the solution can be implemented in a manner that is considerably preferred to traditional solutions of routing them together. In physical terms, the apparatus required for handling the voice links of a certain number of calls is dozens of times multiple compared to equipment for handling the signalling of a matching number of calls.

In practice, a new telephone exchange has been traditionally required for handling the same service that can now be handled with ISU.

An existing telephone network can be flexibly and expediently provided with extra services without having to modify the network elements. In addition, they can be designed independently of equipment suppliers for diminishing the dependence of operators on certain equipment suppliers. The modernization of a network effectively adds to the service life of exchanges.

The implementation of new networks provided with latest services will be clearly more economical than what is done at present.

In terms of its price/performance ratio, the solution is superior over what is available at present.

The invention will now be described in more detail with reference made to the accompanying drawings, in which FIG. 1 shows the physical configuration of an ISU, FIG. 2 shows the operating principle of a duplexed ISU, FIG. 3A shows the connections of a GSM network and a PSTN network without an ISU, FIG. 3B shows the implementation of a Messenger service in a GSM network by means of an ISU, FIG. 4A shows Signalling in a successful call, FIG. 4B shows Signalling when a call is not answered and an ISU is in use, FIG. 5 shows the introduction of IN, (intelligent network) services in an existing network by means of an ISU, FIG. 6 shows the handling of a "121" service with an ISU in a GSM (Group Special Mobile) network, FIG. 7 shows the signalling of a "121" service by using an ISU, FIG. 8 shows an ISU as a signalling converter,
FIG. 9 shows the use of an ISU in supplying a notification.

An Apparatus of the Invention, ISU, Intelligent Signalling Unit

FIG. 2 illustrates functional blocks according to SS#7 implemented by an ISU in a mobile network application. The abbreviations included in the figure refer to the signal protocol SS#7 of ITU-T.
ISUP ISDN User Part
TUP Telephone User Part
MAP Mobile Application Part
TCAP Transaction Capabilities Application Part
SCCP Signalling Connection Control Part
MTP Message Transfer Parts 1–3
IAH Intelligent Application Handler
A module carrying out the services in ISU The services are carried out on the TUP/ISUP level of SS#7. This is represented by a block IAH (Intelligent Application Handler) shown in the diagram in connection with Call Handler. IAH is a routinely implemented function with its contents varying according to application and services. The signalling of calls is followed by a user part, e.g. ISUP. IAH issues commands to ISUP in order to be able to pick up e.g. certain types of calls according to whether services have been prescribed to a particular subscriber. Thus, IAH can set detection conditions according to which, in certain conditions (a certain type of situation in call processing), ISUP informs IAH about the fulfillment of a detection condition. Thus, IAH transmits the information to SCP.

Thereafter, the SCP (Service Control Part) carries out the service. SCP is a standard network function, wherein the actual procedures required by a service are specified.

The functional blocks of ISU are of a similar type also in other than mobile networks, just the names may be different. For example, MAP (Mobile Application Part) is the subscriber-specific block of a mobile network, the counterpart block in an IN-network being INAP (Intelligent Network Application Part).

The following describes a few exemplary applications of the invention.

Implementation of a Messenger service in a GSM network

The question is about a service, in which an a-subscriber can leave a message with the operator to be transmitted further to a b-subscriber, if the b-subscriber is e.g. busy or does not answer.

The need for a Messenger service is often in evidence with operators whose telephone network is the source of a lot of calls to the network of some other operator. If the b-subscriber does not answer, there will be no billing either. A common problem is that the exchanges are not capable of forwarding the message of an a-subscriber. Technically it is not impossible to implement but the exchange manufacturers are not always willing to carry out such extra services.

One example is a GSM-network, from which MS calls to an immobile PSTN network for POTS (FIG. 3B).

The network is provided with an ISU with the signalling links of all calls being delivered thereto by means of routing charts included in the exchanges.

Thus, the signalling of all calls outgoing from Gateway MSC is handled by ISU while the voice is linked directly to GMSC from other MSCs (Voice channels).

When MS calls and POTS does not answer, ISU registers what happened and directs the call to a Messenger service, wherein MS can leave a message (Example voice path for message deposit). After a certain period of time, ISU checks whether POTS is present and, if it answers, the message included in Messenger is delivered.

FIG. 4B illustrates signal links in the exemplified situation.

The IAMs coming from the MSC of a PLMN are monitored with ISU and transmitted further to GMSC as well as held until an ANSWER-message is received from POTS. If that is not received within a certain time frame, the caller is requested to leave a message. ISU works out a routing to the mailbox (MESSENGER VMS), no exchange is needed. After a certain time period, ISU checks whether the desired subscriber is present (CLRFWD). If the subscriber answers (LINE FREE), an acknowledgement is transmitted from him or her to ISU, (ACK) which informs about the left message (IAM) and starts the playback of the message.

In view of carrying out the service, ISU must be provided with an ISUP implementation for emulating the operation of an exchange, as well as with MTP.
MSC Mobile Switching Centre Telephone exchange of a mobile network
GMSC Gateway MSC Exchange whereby a mobile network is in communication with other networks
PSTN Public Switched Telephone Network Public immobile telephone network
PLMN Public Land Mobile Telephone Network Mobile network
MS Mobile Subscriber Subscriber in a mobile network
POTS Plain Old Telephone Set Subscriber in an immobile network
IAM Initial Address Message Message with the specified data from a call The capacity of an ISU is estimated by examining a system of 1 million subscribers. It is estimated that 10% of the subscribers would make an out-of-network call during a busy hour. This equals to 100,000 calls, 30 calls a second. This is roughly the capacity of a single ISU. In reality, the situation is better than this.

Modernization of a Telephone Network by Boosting its Intelligence

Telephone operators have a diversified assortment of exchanges in their networks from a variety of suppliers, of various generations, representing different technologies (analogous, digital, immobile network, mobile network). Thus, a highly heterogeneous environment and hence a problematic one in terms of the implementation of IN services. The exchange suppliers are not always willing to participate in the development of IN services. The manufacturer-specific technique and closed systems can be used for securing the supplier loyalty of a customer much more effectively than by operating on open standards. Similarly, the exchange suppliers are scared of the prospect of other entrepreneurs finding their market.

The IN standards are still to a certain degree at the stage of development and the fact of the matter is that there are not significant volumes of IN applications in the world. The unfinished standards have complicated the generalization of joint efforts by various manufacturers and the exploitation of benefits gained by the economics of scale.

SSP (Service Switching Point), which would be required for the implementation of IN services with available technology, is bulky and thus a major investment for an operator. In general, IN is a major investment for any operator and incurs feasibility problems and has been a somewhat limiting factor for the development of IN designs. Another reason why SSP is expensive is that there are few competent suppliers and the implementation requires special technology which is only available to major exchange manufacturers.

The following describes by way of a list some IN services that could be practically carried out by using the present method:

Answering Service

SSP (service Switching Point) notices if telephone is not answered or it is busy and transfers the control to SCP (Service Control Part), which requests the caller to leave a message to be forwarded later. The message is recorded. SCP subsequently tries the number at one-minute intervals and, as it gets through, delivers the message, i.e. requests SSP to make an outgoing call and to switch IP (Intelligent Peripheral) on line for the duration of delivering the message. IP is an intelligent peripheral device which performs .e.g. message processing.

Speed Dial

A call to a special service number that speed-dial numbers are controlled from. SCP identifies the A-number and asks the caller whether they wish to define, delete or change their speed-dial numbers. The speed dial itself is effected by calling directly to the speed-dial number.

Rendezvous

Picks up a call and connects it to the last person who has tried to call but failed.

Queuing

Instead of a normal tone signal the caller is informed about the number of other subscribers in a queue, about the number of answering persons in service and about the estimated holding time. If the caller is in a hurry, they can request a return call as soon as answering persons become available.

The problem is basically solved by replacing SSP with ISU. The main points of implementation briefly according to FIG. 5:

An exchange or centre C is ideally the concentration point of a network.

The services using IN services are specified in the routing charts of exchanges A and B for proceeding to ISU which, from the point of view of a network, is visible as an exchange. It has its own Signalling Point and a separate ISUP (ISDN User Part) address. However, the voice from A and B is connected directly to C. ISU monitors the signalling passing therethrough to find out whether certain services have been specified for a particular subscriber by means of so-called detection conditions.

For example, if a telephone located within the range of B is used to place a call to the range of C, as soon as IAM is received from B, ISU runs through the detection conditions set for IAM and sends a notification to SCP if one of the detection conditions is fulfilled (i.e. an IN-service is specified). SCP controls the procedures required by the service.

In case no detection condition is fulfilled (i.e. if no IN-service is specified for this particular IAM), ISU sends IAM forward to exchange C for connecting a normal voice link.

An existing network can be flexible (and quickly) provided with IN features without having to modify the network elements. In addition, those can be done independently of an exchange supplier.

In terms of the price/performance ratio, the solution is superior compared to what is available at present. The reason for this is that the question is merely about signalling and the expensive aspect of a voice path can be omitted—or rather the existing (already paid for) infrastructure can be exploited.

Implementation of a "121" Service in a GSM Network

The voice mail systems generally make use of a so-called "121" service. Its operation is such that a mobile subscriber calls to the short-dial number 121 and the call is directed to a voice mail, whereafter the subscriber can listen through their mailbox or make settings.

No working solution has so far been invented for the implementation of a "121" service in a decentralized system. The problem lies in the fact that a PLMN network is not capable of routing a call to a correct VMS node point in the network on the basis of a A-number, as the routing is effected on the basis of a B-number (i.e. 121). On the other hand, from the viewpoint of user friendliness, it completely unacceptable that the subscribers be given different playback numbers depending upon where their mailboxes happen to be located.

One solution to the above problem would be to arrange the VMS node point such that all 121 calls would go there. Then, after receiving the A- and B-numbers, said node point would route the call to a correct location by making a so-called "call bridging". The solution is problematic as takes up a large number of voice transmission lines. Even a number which is double relative to the number calls: one in and one out. As for the exchanges, it would likewise take up quite unnecessary switching capacity.

The call transfer service could be used as a solution but is not often available, Even that would involve the problem of unnecessary use of voice transmission lines, though in a smaller scale as the call durations would be considerably shorter.

A solution of the invention is to route all calls in a network over a given concentration point (C MSC). The signalling of calls coming to this particular concentration point is circulated over ISU. Thus, ISU finds out from the IAM message an A-number and can check its own data base for the location of a physical VMS node point associated with this subscriber (the node point of A VMS is A MSC). After doing this, ISU sends a modified IAM message to the concentration point. This message contains such a B-number which an exchange included in the concentration is capable of routing to a correct VMS node point (A MSC), since the routing is specified in the routing charts of the exchanges. Thus, in this application, ISU handles a data base, wherein an individual VMS and its node point are specified for each subscriber.

Signalling Converter

There is often a need for links between such exchanges that do not have a common signalling protocol. For example, very few suppliers have a ready solution for French SSUTR2 and English BTNUP user parts.

Figure 1:
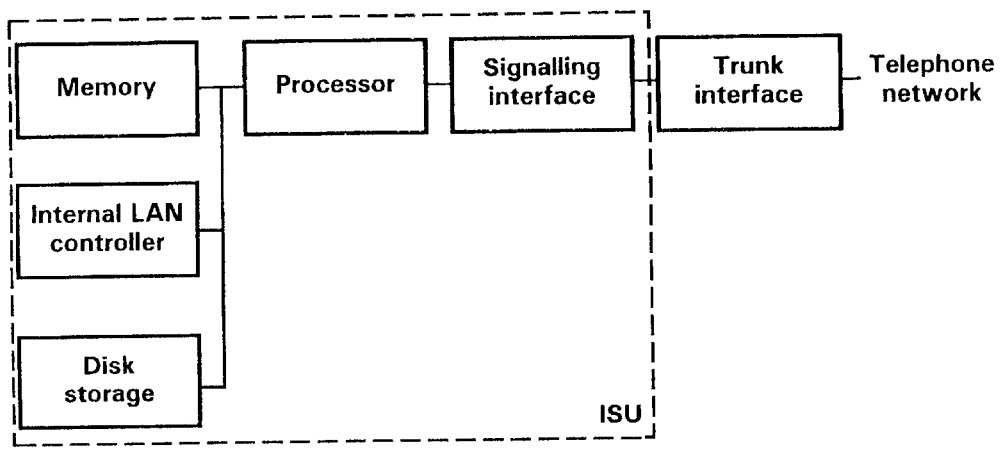
Figure 2:
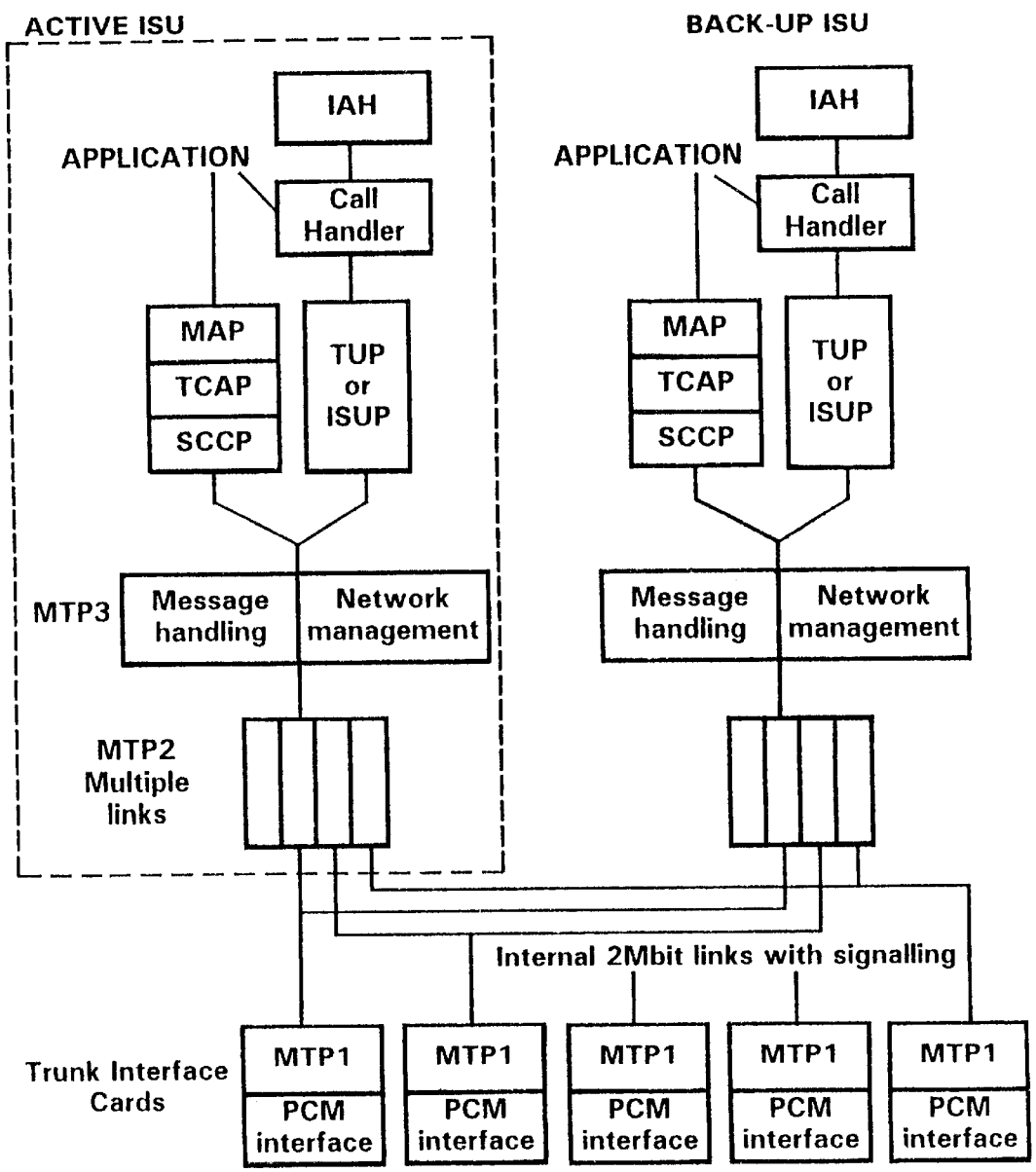
Figure 3A:
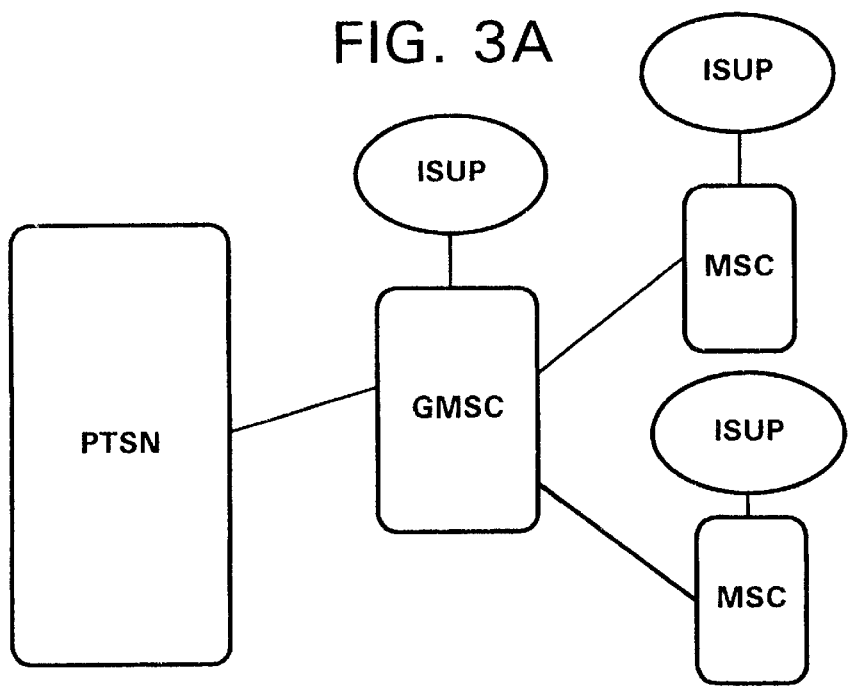
Figure 3B:
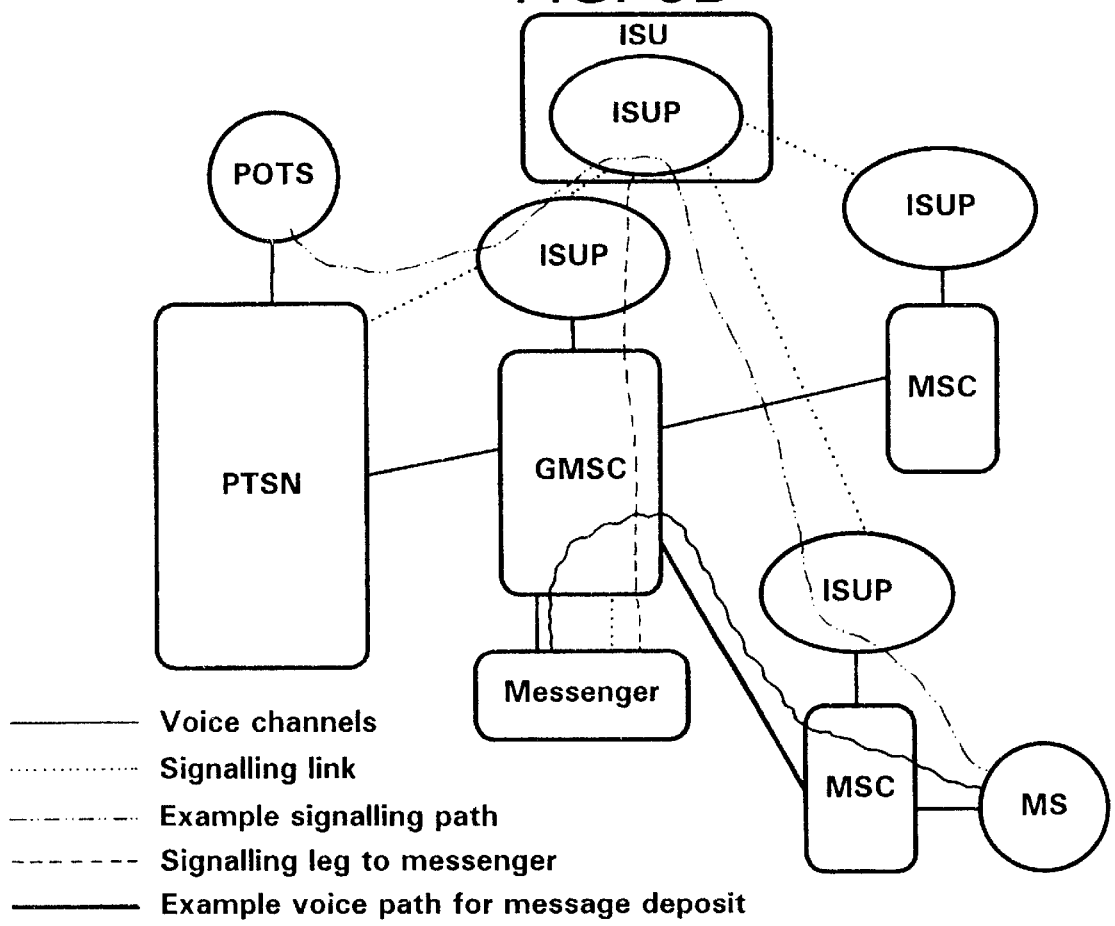
Figure 4B:
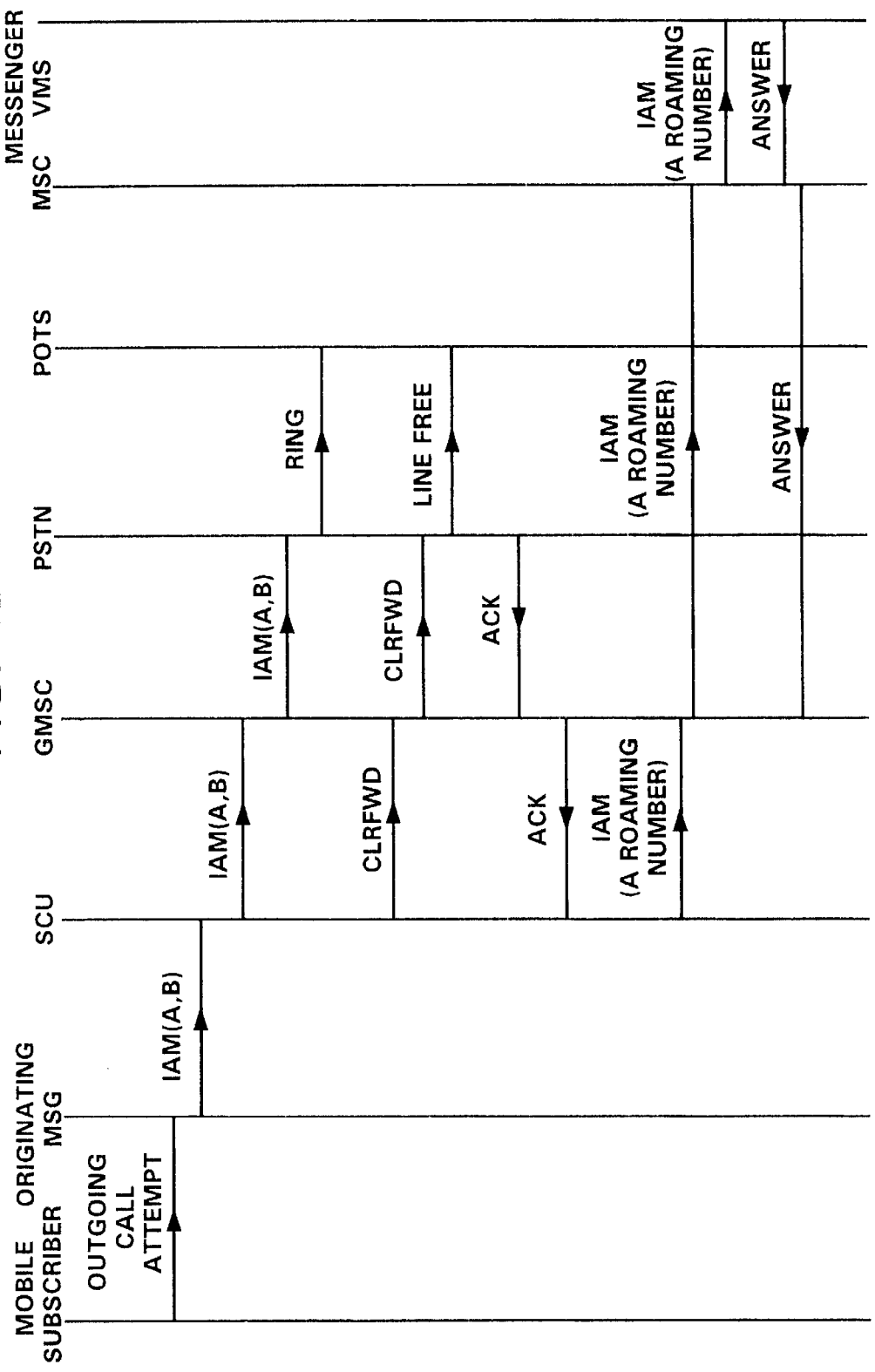
Figure 5:
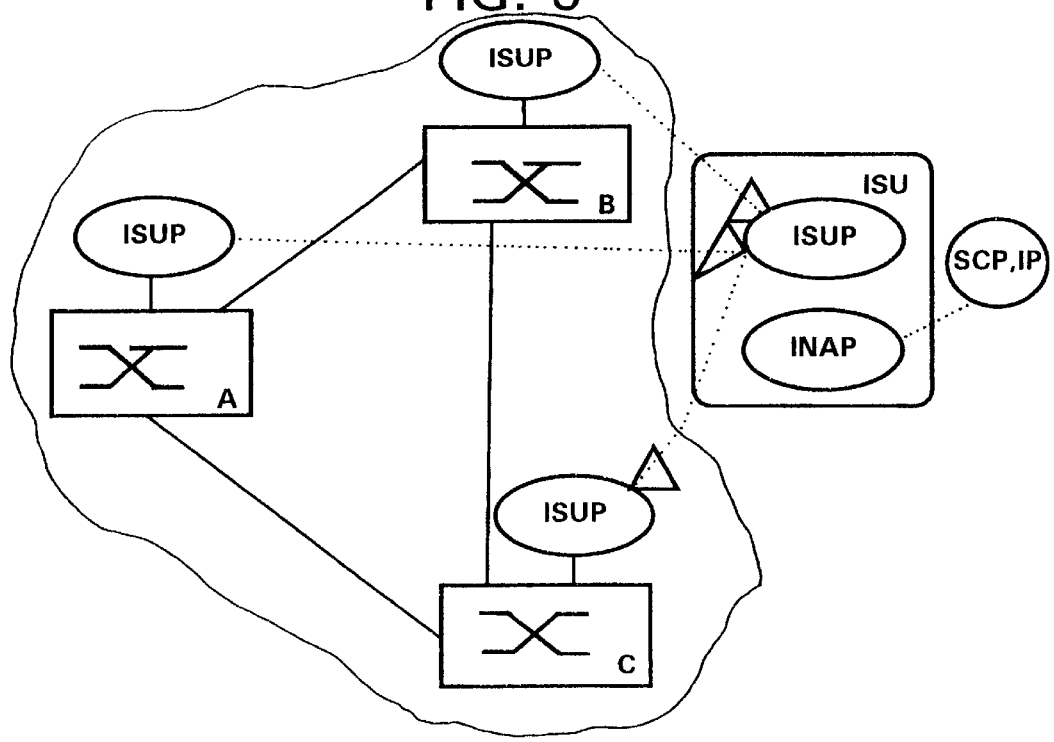
Figure 6:
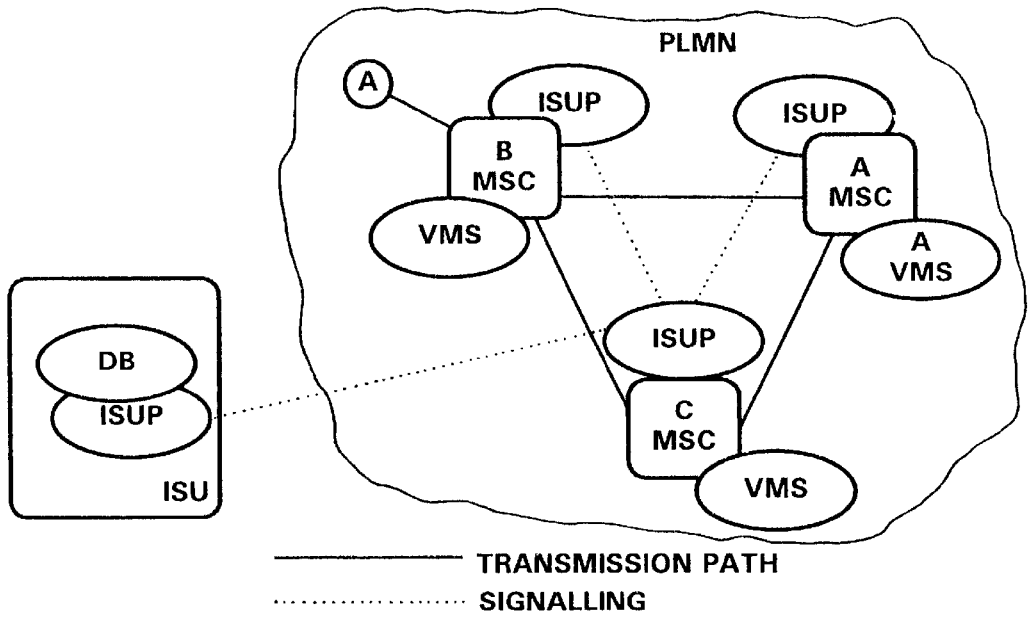
FIG. 6 shows a GSM network which is provided with ISU for handling the "121" service.
Figure 7:
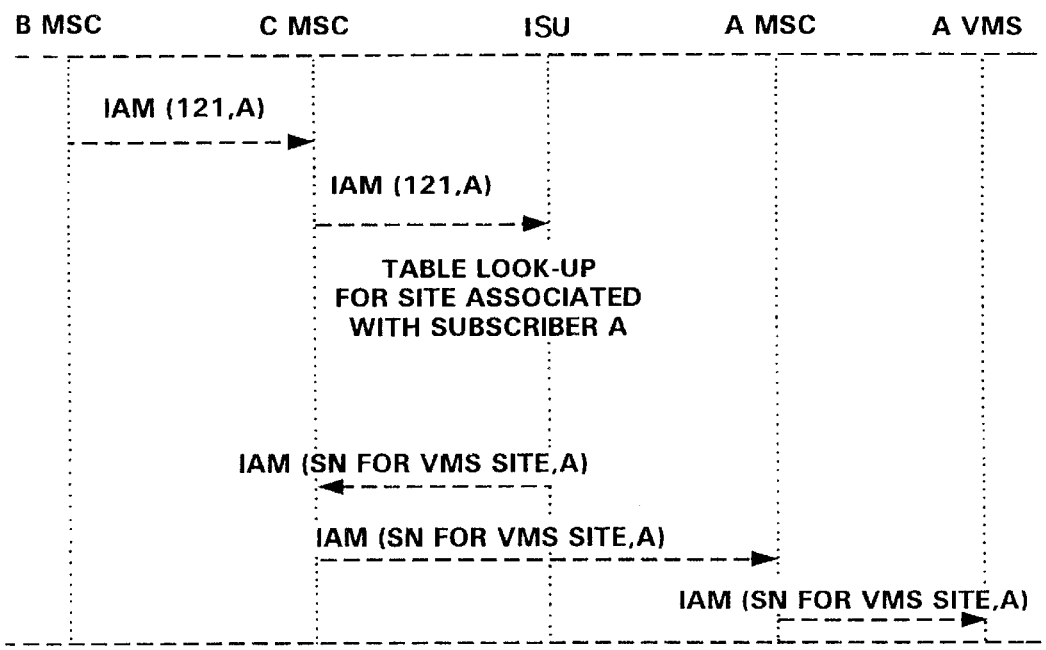
FIG. 7 illustrates signalling in an exemplary case.
Figure 8:
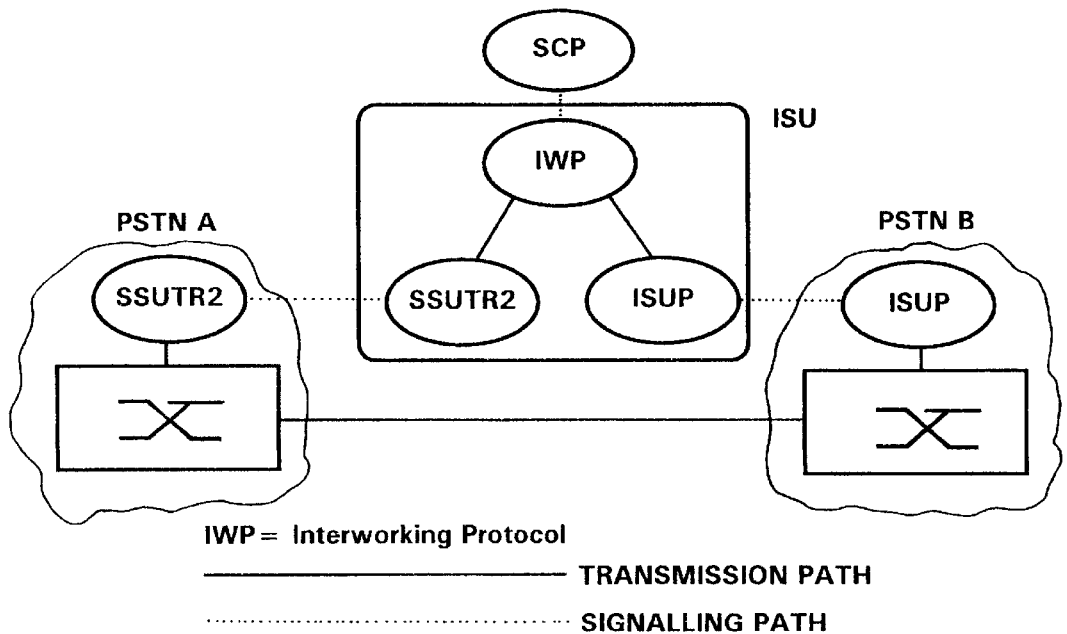

According to the invention, the signalling between user parts of various types of exchanges is routed over ISU, in which IWP (Interworking Protocol) handles the matching of signalling protocols. In this case, the service-implementing block IAH is an IWP. The block diagram is shown in FIG. 8. The ISUs can be interfaced with an SCP if extra features are desired in the connecting traffic.

A highly competitive solution in terms of price. Two SCU frames are capable of handling the connecting traffic of 50–100 PCMs. Flexible and expedient to implement.

By means of an optional SCP it is possible to introduce intelligent features into the connecting traffic. For example, special billing tariffs, traffic monitoring for finding reference values A and B for the mutual billing of operators, blocking of certain numbers, such as freefone and premium rate, in international traffic, etc.

Providing Notification in a PSTN Answering System

The difficulty of providing notification in the voice mail systems of an immobile network has been one important reason why the answering services have not become more popular. The notification refers to a notice provided by the system to inform a subscriber about a message left for him or her in the voice mailbox.

Figure 9:
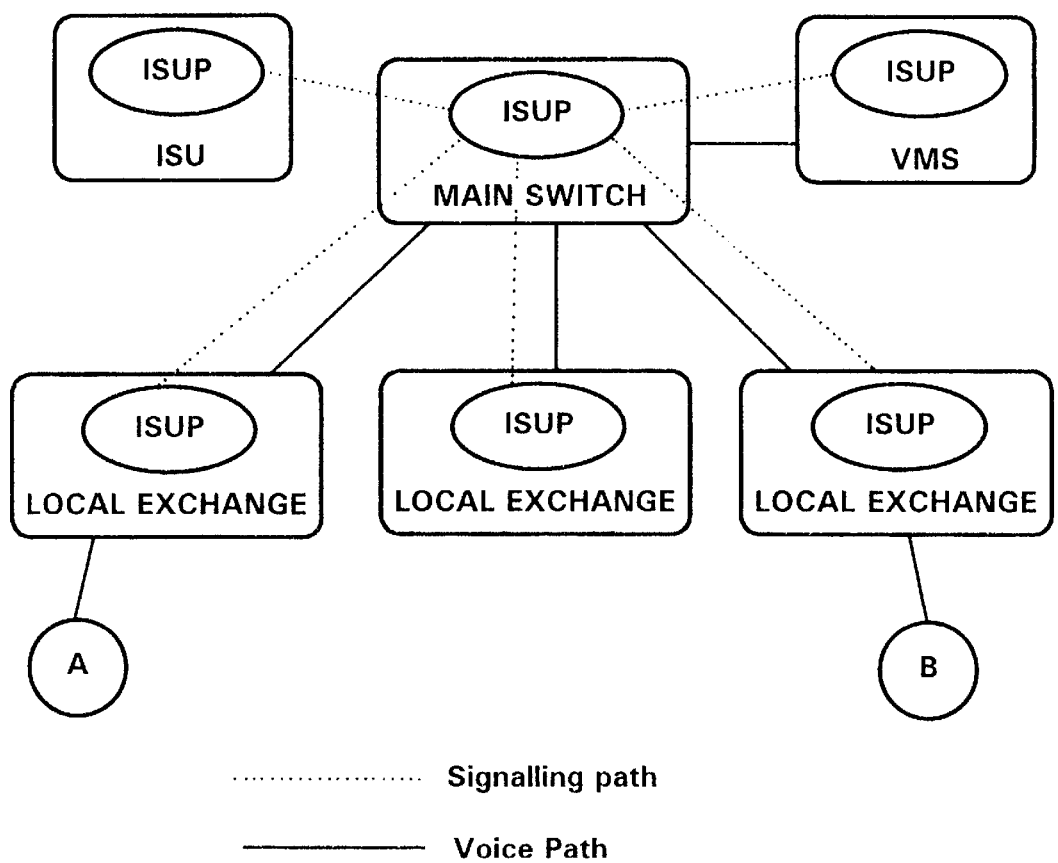

A solution of the invention is depicted in FIG. 9.

ISU is physically connected to a main switch only (simplifies the systems as there may be a large number of local exchanges).

All signalling, which is associated with a traffic terminating in the sub-circuits of local exchanges, progresses through the user part ISUP included in ISU.

ISU monitors whether a call to a sub-circuit is successful or not. If it is not and if a voice mail service is subscribed to, ISU transfers the call to VMS.

If calls are directed through ISU (in or out) relating to a subscriber who has material yet to be played back in his or her mailbox, an outgoing call is made to the subscriber immediately after the termination of a detected successful call for delivering a notification. At this point, the subscriber is known to be present.

ISU is aware of the loading condition of the lines extending to local exchanges and, thus, by means of some suitable algorithm, it is capable of making outgoing calls during a slow traffic.

No modifications to the exchanges. Nonetheless, even highly advanced services are feasible.

Other exemplary applications flexible implementation of so-called call transfer services connection of ISU by just one secured link to a single exchange monitoring of the loading condition of telephone lines and implementation of the voice-mail playback algorithm according to this loading condition monitoring the state of a circuit, if there is activity, a desired service is switched on.

What is claimed is:

1. A method for implementing telephone network services for a plurality of subscribers in an existing unmodified network provided with co-channel signaling comprising voice and signaling transmissions, said method comprising the steps of:

connecting a central intelligent node point from outside of said network to said network, said node point being capable of handling approximately 30 out-of-network calls per second made by said subscribers;

routing said signaling transmissions over said node point and converting signaling information contained within said signaling transmissions, at said node point for carrying out said network services; and routing said voice transmissions around said node point, in response to instructions received from said node point.

2. The method of claim 1 used to carry out the services of an intelligent network.

3. The method of claim 1 which includes implementing a 121 voice mail service in a group special mobile network.

4. The method of claim 1 which includes matching signaling between user parts of various types of exchanges.

5. The method of claim 1 which includes implementing a notification in a voice mail system of an immobile network.

6. The method of claim 1 wherein voice and signaling transmissions are transmitted regardless of the presence of a receiving subscriber.

7. An apparatus for implementing telephone network services for a plurality of subscribers in an existing unmodified network provided with co-channel signaling comprising voice and signaling transmissions, said apparatus being outside of said network and functioning independently of network switching equipment, said apparatus being capable of handling approximately 30 out-of-network calls per second made by said subscribers, said apparatus comprising:

a microprocessor;

an internal memory; and an interface arranged to communicate with said network to monitor signaling information directed therethrough, to identify calls having services specified therefor, to convert said signaling information to a format which can be understood by a receiver for carrying out said services, and to direct said calls to said receiver.

8. An apparatus as set forth in claim 7, characterized in that a plurality of such apparatus can be connected in parallel for an increased capacity and reliability.

9. An apparatus as set forth in claim 7, characterized in that a plurality of said apparatus can be connected in a decentralized fashion in a common telephone network.

10. The apparatus of claim 7 including means for carrying out the services of an intelligent network.

11. The apparatus of claim 7 including means for implementing a 121 voice mail service in a group special mobile network.

12. The apparatus of claim 7 including means for matching signaling between user parts of various types of exchanges.

13. The apparatus of claim 7 including means for implementing a notification in a voice mail system of an immobile network.

14. The apparatus of claim 7 wherein means are provided for transmitting voice and signaling transmissions regardless of the presence of a receiving subscriber.

* * * * *